Oct. 14, 1941.  W. L. WELLS ET AL  2,259,123

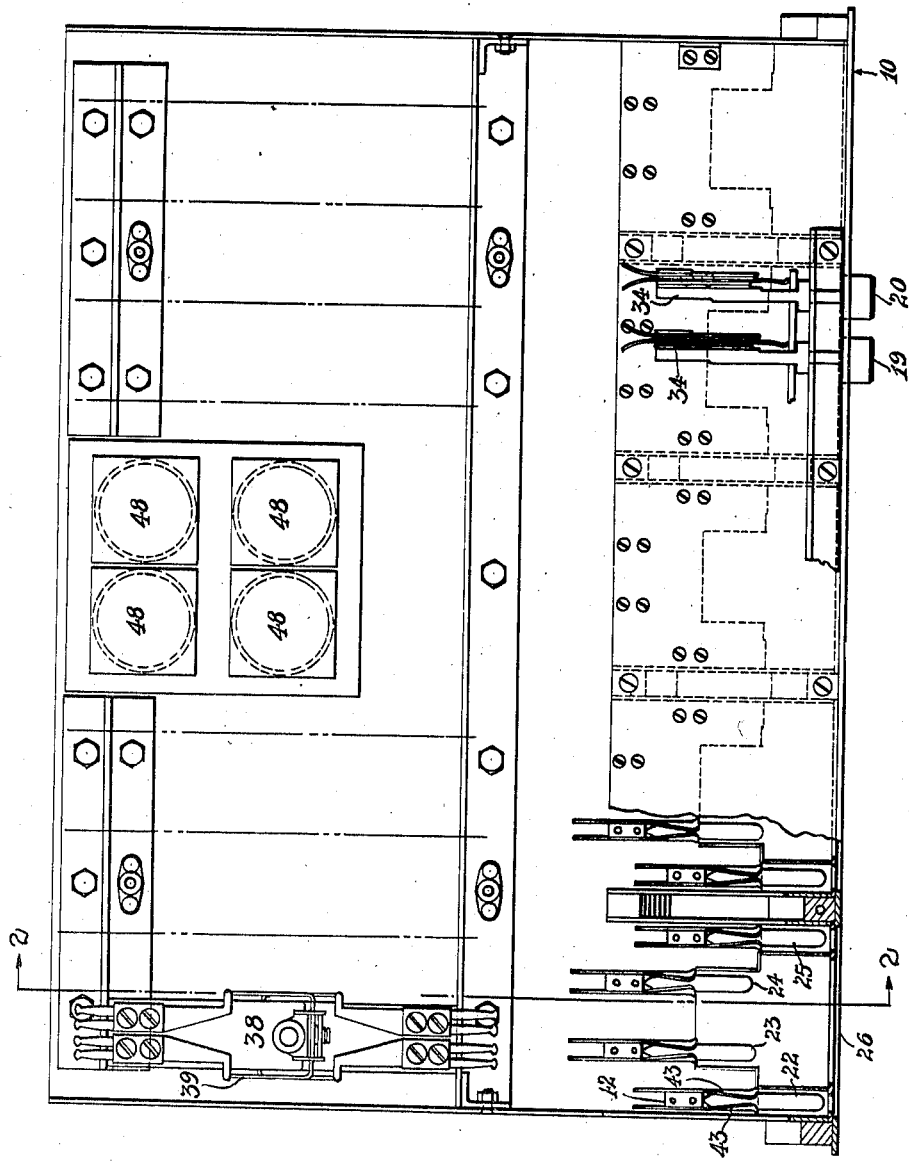

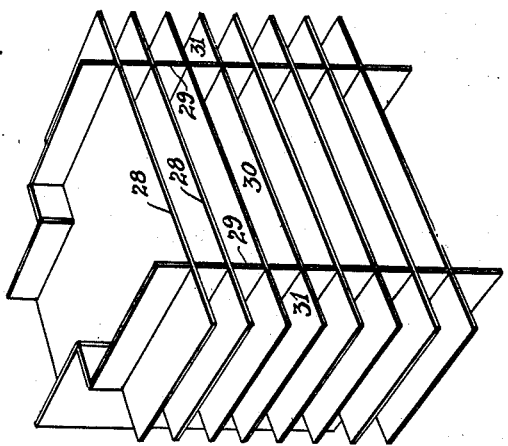
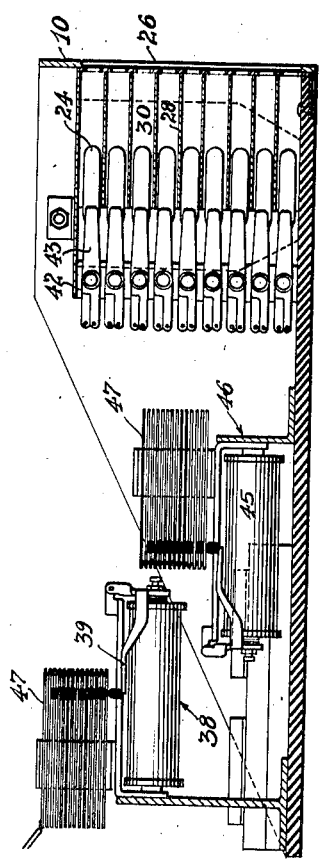
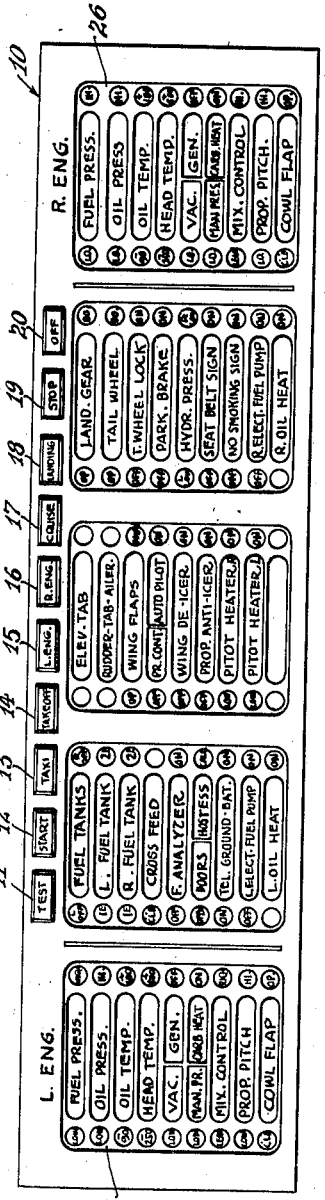

AIRCRAFT INDICATING SYSTEM

Filed July 9, 1938  5 Sheets-Sheet 4

INVENTORS
WILLIS L. WELLS &
RAYMOND A. RUGGE.
BY
ATTORNEY

Patented Oct. 14, 1941

2,259,123

UNITED STATES PATENT OFFICE 2,259,123

AIRCRAFT INDICATING SYSTEM

Willis L. Wells, Clayton, and Raymond A. Rugge, Ferguson, Mo., assignors to Curtiss Wright Corporation, (St. Louis Division), a corporation of Delaware Application July 9, 1938, Serial No. 218,346

11 Claims. (Cl. 177—311)

This invention relates to signaling or indicating systems and is particularly applicable to aircraft.

In modern transport aircraft, a large number of instruments and control devices are used, the instruments and controls being vital to the proper operation of the aircraft, the instruments giving important information as to the immediate conditions existing in the power plant system, the electrical system and the like as to whether the operation of the several instrumentalities is within or without a prescribed range. If the various indications are observed in time, when the instrumentalities are not properly functioning, precautions may be taken to guard against their complete failure and to guard against the possibility of aircraft accidents.

Since the airplane is subject to a number of different phases of operation, and since the numerous instruments and controls may have different limiting positions in the different phases of operation, it is necessary for the aircraft crew to definitely know the proper operating limits in the several phases and to make continual observations of the instruments and controls to be sure that the instrumentalities which they record or govern are functioning properly. Likewise, before changing from one flight phase to another, all of the several instruments and controls must be checked by the crew to determine that they are in the appropriate range of operation or adjustment for the next phase.

It is humanly impossible to observe all instruments and controls at one time and although an increase in the number in the crew permits of decentralization of aircraft control, with an appropriate sub-division of the instruments and controls under the jurisdiction of respective crew members, this is still not an assurance that important facts will not be overlooked. In bad weather operation it becomes particularly difficult to pay careful attention to all details since the crew must concentrate on the few dominant instruments and controls necessary to the maintenance of proper aircraft attitude, direction, and altitude. With this problem in mind, the present invention has been developed and it is believed that this system when used, will go far in simplifying the duties of the aircraft crew and in eliminating so called "pilot error" as a cause of accidents, thereby improving the safety of aircraft transport.

In outlining the aircraft problem more specifically, it will be appreciated that the several phases of operation include engine starting, taxiing on the ground, take-off, cruising and full power flight, landing, and also flight operation on less than the full complement of engines. Another phase of "stopping" may be included to be sure that all of the aircraft instrumentalities are in proper position, and power devices turned off after a landing has been effected. Among the numerous instrumentalities of the aircraft are—retractable landing gear, wing flaps, controllable pitch propeller, trimming tabs, parking brake, auxiliary power, and various engine instrumentalities such as oil pressure, oil temperature, mixture control, cowl flaps, fuel pressure, and many others. These are all in addition to the basic flight instruments such as artificial horizon, directional instrument, bank and turn indicator, altimeter, climb indicator, etc., the latter group comprising the dominant instruments which must be utilized during flight. In many instances, present operation practice includes the use of check sheets for each operating phase in which the pilot or his assistant records or checks the reading or position of the various instruments or controls on a printed list prior to transition from one phase to another and although this system of checking helps toward the elimination of error, it is obviously an arduous task which consumes a greater amount of time than is consistent with the normal high speed of aircraft transport operation.

An object of this invention is to provide a unitary signaling system wherein the condition of all of the dominant controls and instruments are indicated by lights on a single panel so that the indicators immediately apprise the observer when he scans the panel whether the instrumentalities are either properly adjusted or are properly functioning. A further object of the invention is to provide means for preselecting for indication only those indicators which are appropriate to a contemplated or current operating phase, the balance of the indicators remaining inactive until such time as they are preselected in the operating phase to which they are appropriate. A more general object is to provide a unitary "tell-tale" indicating system for aircraft or other mechanism, the operation of which may be coordinated with current or contemplated operating phases. Still another object is to provide an indicating system so arranged that, when instrumentalities are properly functioning no indication is given, but, when any one instrumentality is functioning improperly, or is not adjusted properly, it will indicate this fact to the observer whereupon he may take whatever steps he can to correct the situation. Still another object is to provide a unitary indicating system which may be installed as a unit in convenient proximity to the aircraft pilot or crew, connections from the unitary indicating device being led to the various instrumentalities with which the unit is associated.

The above introduction states the general objectives of the invention and presents a brief summary of the problem for which the invention provides a solution. Further objects of the invention, and a better understanding of the details thereof, may be obtained by the reading of the annexed description in connection with the drawings in which similar numbers indicate similar parts and in which:

Fig. 1 is a plan of the indicating unit;

Fig. 2 is a section on the line 2—2 of Fig. 1;

Fig. 3 is a front elevation thereof showing the indicating panel with legends appropriate to a majority of the instrumentalities of a bi-motored aircraft;

Fig. 4 is a perspective elevation of a light cell assembly of the indicating unit;

Figure 5:
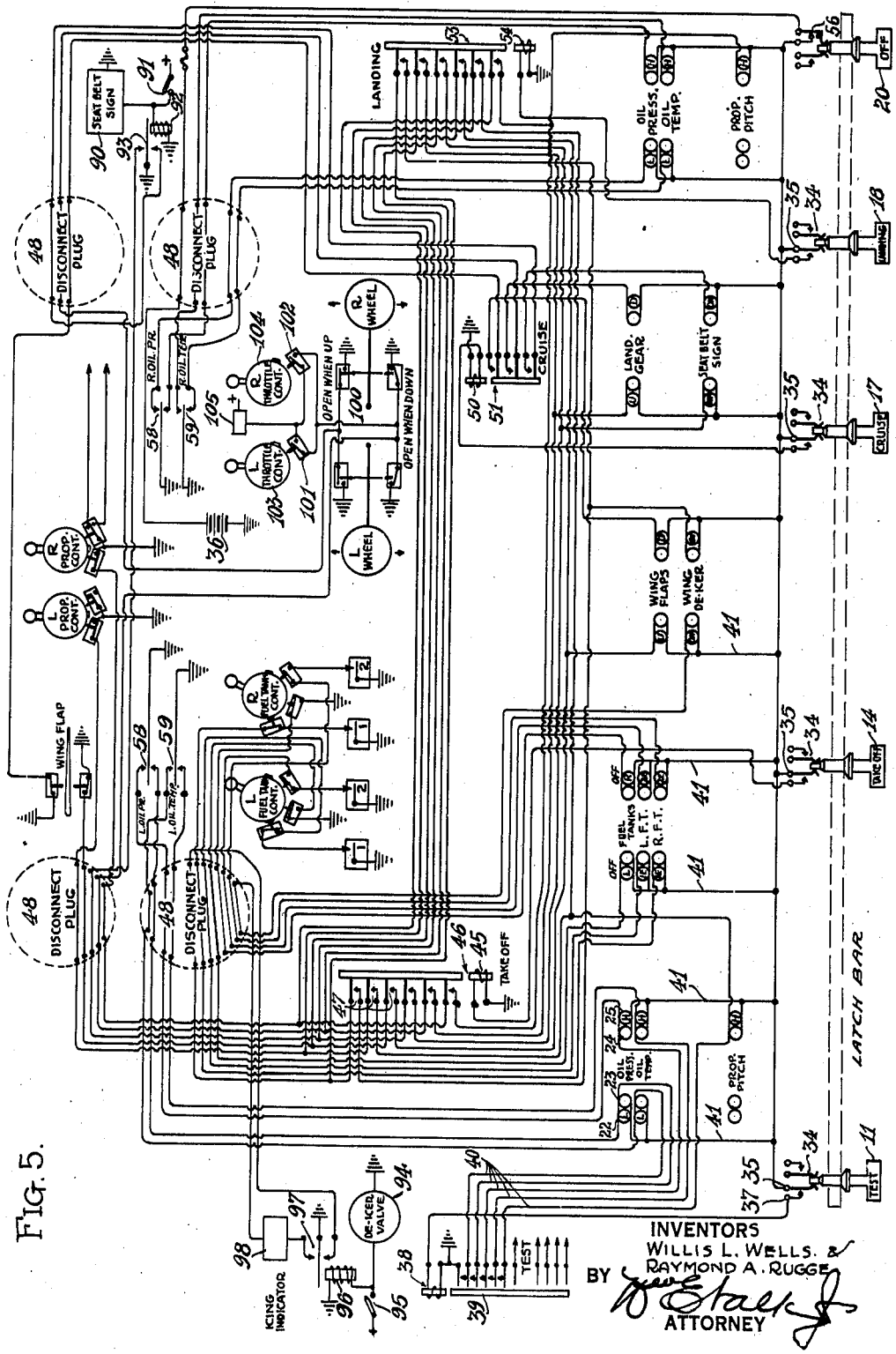
Fig. 5 is a schematic wiring layout showing a simplified version of the system.

Reference may first be made to Fig. 3 which shows a rectangular panel 10 adapted to be placed upon the instrument board of an aircraft in clear view of the pilot or crew. This panel has a plurality of buttons 11 to 20 inclusive which are arranged to interlock in a well-known manner so that when one button is pushed it will remain depressed and release any previously depressed button. The several buttons as shown in Fig. 3 represent different operating phases for an aircraft. The general function of these buttons will be briefly explained, and their specific action upon the indicating system will be described later in detail. Sets of lamps 22, 23, 24 and 25 are placed behind several translucent panels 26 flush with the panel 10. The several lamps are confined within opaque cells defined by a partitioned unit as indicated in Fig. 4, this unit comprising a plurality of superimposed horizontal partitions 28 and spaced vertical partitions 29 defining flat central rectangular cells 30 within each of which a lamp 23 and a lamp 24 is located and defining end cells 31 within which respectively lamp 22 and lamp 25 are located. Each pair of lamps 22—23, and 24—25 are connected in parallel to coincidentally illuminate the name cell 30 and the status cell 31. The translucent panels are provided with masks to outline the respective cells 30 and 31 on the panel and each set of cells 30 and 31 is marked with the name or suitable identification of an aircraft instrumentality to be indicated, and the limiting operating conditions thereof. It will be seen in referring to Fig. 3 that the left-hand and right-hand panels 26 relate to engine instruments and functions whereas the central three panels 26 relate to instrumentalities concerning the functioning of the aircraft itself in addition to instruments and functions of the power plants. By depressing any one of the several buttons 12 to 19 inclusive, one or more of the sets of lamps 22—23 or 24—25 will be preset for lighting in response to the functioning of the appropriate instrumentality concerned. When the "test" button 11 is depressed, all lamps on the panel will be energized so that the operator is assured that no lamps are burned out. When the "start" button 12 is depressed, left and right propeller pitch high, left and right lean mixture control, left and right cowl flaps closed, parking brake off, automatic pilot on, right and left fuel pressure low and various other engine indications, will be energized so that if the respective instrumentalities are in the above named positions, the respective lights in the panels 26 will be illuminated. Such illumination indicates an erroneous condition whereupon the operator will control each instrumentality to that position in which its light goes out, whereupon it is in proper position for starting. When the lights are out the operator may proceed to start the engines.

Having started the engines and warmed them up, and being ready for taxiing the aircraft to its take-off position, the pilot presses the "taxi" button 13 which brings into action a new grouping of indicating lights. If any of the lights appropriate to this phase illuminate the panel, an erroneous condition is indicated which must be corrected. The same sequence is followed throughout the several subsequent operating phases of take-off, cruising, left engine operation, right engine operation, landing, and stopping. For a comprehensive representation of the particular indicator lights which are placed in readiness for actuation by respective instrumentalities, reference may be made to the chart below, which tabulates the several operating phases and all the indicators shown in the panel 10 of Fig. 3. In the following chart, as well as in the subsequent chart for a simplified version of the system, the letter C in each instance means circuit closed, while the dashes indicate open circuits.

|  | Start | Taxi | Take-off | Left engine | Right engine | Cruise | Landing | Stop |
|---|---|---|---|---|---|---|---|---|
| Left engine | | | | | | | | |
| Fuel press.: | | | | | | | | |
|   Low | C | C | C | C | ------ | C | C | C |
|   High | C | C | C | C | ------ | C | C | C |
| Oil press.: | | | | | | | | |
|   Low | C | C | C | C | ------ | C | C | C |
|   High | C | C | C | C | ------ | C | C | C |
| Oil temp.: | | | | | | | | |
|   Low | C | C | C | C | ------ | C | C | C |
|   High | C | C | C | C | ------ | C | C | C |
| Head temp.: | | | | | | | | |
|   Low | C | C | C | C | ------ | C | C | C |
|   High | C | C | C | C | ------ | C | C | C |
| Vacuum: Low | C | C | C | C | ------ | C | C | C |
| Generator: Off | C | C | C | C | ------ | C | C | C |
| Man. press.: Low | | | C | | ------ | | C | |
| Carb. heat: On | ------ | ------ | C | C | ------ | ------ | ------ | ------ |
| Mix. control: | | | | | | | | |
|   Lean | C | C | C | C | ------ | ------ | C | ------ |
|   Rich | | | | | | C | | C |

|  | Start | Taxi | Take-off | Left engine | Right engine | Cruise | Landing | Stop |
|---|---|---|---|---|---|---|---|---|
| Prop. pitch: | | | | | | | | |
| Low | | | | | C | | | |
| High | C | C | C | C | | | C | |
| Cowl flap: | | | | | | | | |
| Closed | C | C | C | C | | | | |
| Open | | | | | C | C | C | |
| Fuel tank: | | | | | | | | |
| L—Off | C | C | C | C | C | C | C | C |
| R—Off | C | C | C | C | C | C | C | C |
| L. fuel tank: | | | | | | | | |
| 1—Empty | C | C | C | C | C | C | C | C |
| 2—Empty | C | C | C | C | C | C | C | C |
| R. fuel tank: | | | | | | | | |
| 1—Empty | C | C | C | C | C | C | C | C |
| 2—Empty | C | C | C | C | C | C | C | C |
| Cross feed: Closed | | C | C | | | | C | |
| F. analyzer: | | | | | | | | |
| Off | | | | | | C | | |
| On | | | | | | | | C |
| Doors: Open | C | C | C | C | C | C | C | C |
| Hostess: Call | C | C | C | C | C | C | C | C |
| Tel. ground: On | C | C | C | C | C | C | C | C |
| Ground battery: On | C | C | C | C | C | C | C | C |
| L. fuel pump: Off | C | C | C | | | | C | |
| On | | | | | | C | | C |
| L. oil heat: On | | | | C | | | | |
| Elev. tab | | C | C | | | | | |
| Rudder | | C | C | | | | | |
| Aileron | | C | C | | | | | |
| Wing flaps: | | | | | | | | |
| Up | | | C | | | | C | |
| Down | | | | C | C | C | | |
| Power control: Off | C | C | C | C | C | | C | C |
| Auto. pilot: On | C | C | C | C | C | | C | C |
| Wing de-icer: | | | | | | | | |
| Off | C | C | C | C | C | C | C | C |
| On | C | C | C | | | | C | C |
| Prop. anti-icer: | | | | | | | | |
| Off | C | C | C | C | C | C | C | C |
| On | | | | | | | | C |
| Pitot heater R: | | | | | | | | |
| Low or off | C | C | C | C | C | C | C | C |
| On | | | | | | | | C |
| Pitot heater L: | | | | | | | | |
| Low or off | C | C | C | C | C | C | C | C |
| On | | | | | | | | C |
| Land. gear: | | | | | | | | |
| Up | C | C | C | | | | C | |
| Down | | | | | | C | | |
| Tail wheel: | | | | | | | | |
| Up | C | C | C | | | | C | |
| Down | | | | | | C | | |
| Tail wheel lock: | | | | | | | | |
| Off | | | C | | | | C | |
| On | | C | | | | | | |
| Park. brake: | | | | | | | | |
| Off | C | | | | | | | C |
| On | | C | C | | | | C | |
| Hydr. press.: | | | | | | | | |
| L—Low | C | C | C | C | | C | C | C |
| R—Low | C | C | C | | C | C | C | C |
| Seat belt sign: | | | | | | | | |
| Off | | C | C | C | C | | C | |
| On | | | | | | C | | C |
| No smoking sign: | | | | | | | | |
| Off | | C | C | C | C | | C | |
| On | | | | | | C | | C |
| R. fuel pump: | | | | | | | | |
| Off | C | C | C | | | | C | |
| On | | | | | | C | | C |
| R. oil heat: On | | | | | C | | | |
| *Right engine* | | | | | | | | |
| Fuel press.: | | | | | | | | |
| Low | C | C | C | | C | C | C | C |
| High | C | C | C | | C | C | C | C |
| Oil press.: | | | | | | | | |
| Low | C | C | C | | C | C | C | C |
| High | C | C | C | | C | C | C | C |
| Oil temp.: | | | | | | | | |
| Low | C | C | C | | C | C | C | C |
| High | C | C | C | | C | C | C | C |
| Head temp.: | | | | | | | | |
| Low | C | C | C | | C | C | C | C |
| High | C | C | C | | C | C | C | C |
| Vacuum: Low | C | C | C | | C | C | C | C |
| Generator: Off | C | C | C | | C | C | C | C |
| Man. press.: Low | | | C | | | | C | |
| Carb. heat: On | | | C | | C | | | |
| Mix. control: | | | | | | | | |
| Lean | C | C | C | | C | | C | |
| Rich | | | | | | C | | C |
| Prop. pitch: | | | | | | | | |
| Low | | | | C | | | | |
| High | C | C | C | | C | | C | |
| Cowl flap: | | | | | | | | |
| Closed | C | C | C | | C | | | |
| Open | | | | C | | C | C | |

Figure 8:
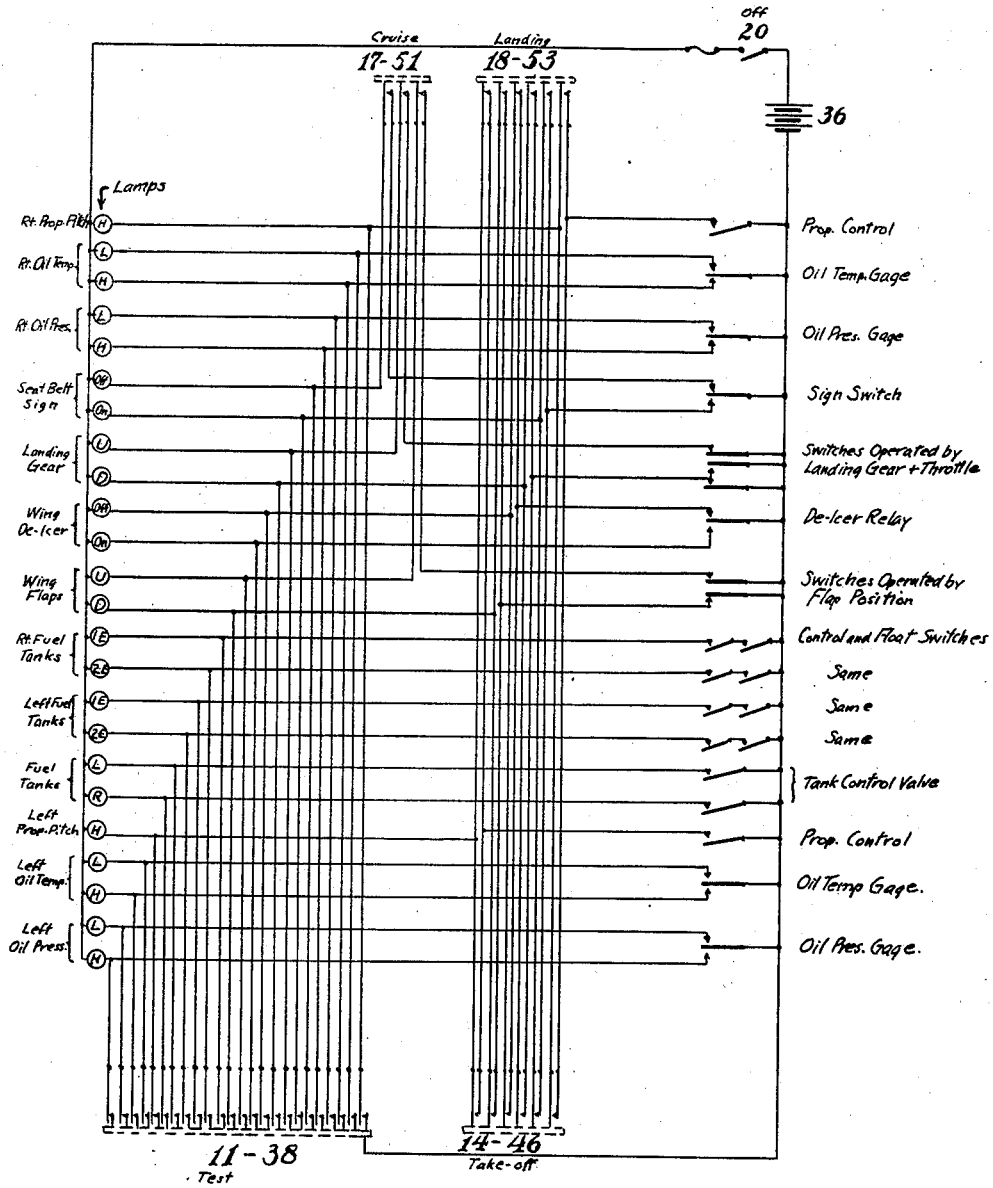
Fig. 8 is a wiring diagram of the simplified embodiment of the system as schematically shown in Fig. 5.

The interconnections and circuits necessary for lighting of the lamps of the particular panel 10 shown become somewhat complicated due to the large number of indicating lights and instrumentalities associated with them. Accordingly, a simplified wiring diagram of a system according to this invention is shown in Figs. 5 and 8 wherein the number of indicators is cut down to 13 and the number of actual flight phases is cut down to 3 besides "Test" and "Off." The particular construction of the panel and the necessary electrical apparatus is the same as in the more comprehensive system so that certain of the structural units shown in Figs. 1 and 2 will be referred to in connection with the detailed description of the functioning of a system according to Figs. 5 and 8.

In Fig. 5, buttons 14, 17, and 18 determine the operating phases of the aircraft for which the indicating system may be set up. These buttons and also button 11 operate on switches 34 each of which has a contact strip 35 connected to a power source 36, the latter in turn being connected to ground. Button 20 controls a master switch in the power line from the source 36. For the test button 11, a contact strip 37, connectable to the strip 35, is wired to the solenoid of a relay switch 38, the other end of the solenoid being grounded. When energized, the solenoid attracts an armature 39 coincidentally closing a plurality of circuits of which those indicated at 40 are typical whereby all of the lamps 22 to 25 inclusive on the whole panel are energized, one side of all of the several lamps being connected to the power source as at 41, the circuit being completed through the relay switch 38 to ground. A typical relay switch is shown in Figs. 1 and 2. Mountings for the several sets of indicator lamps 22 to 25 inclusive are also shown in Figs. 1 and 2 wherein 42 indicates a lamp jack between the prongs 43 of which the respective lamps may be clipped. Replacement of burned out lamps is readily effected by removing one of the translucent panels of which the panel 26 is typical.

Referring again to Fig. 5, when the take-off button 14 is pushed, this closes its switch 34 to energize a solenoid 45 of a relay switch 46 which includes a plurality of jack switches 47 serving to close lamp circuits for the following indicating lamps—wing de-icer on; left propeller pitch high; seat belt sign off; right propeller pitch high; landing gear up; wing flaps up. The other terminals of respective switch elements of the unit 47 are connected through "disconnect plugs" 48 to the respective instrumentalities of the aircraft. The six lamp circuits just mentioned are selective for the take-off operating phase. The other lamp indications, namely, oil pressure, oil temperature (for both engines), and fuel tank switching, are non-selective and remain permanently connected in all operating phases except for single engine operation since they all are relevant to any operating phase.

In preparing for the cruising flight phase after take-off, the cruise button 17 is depressed permitting the take-off button 14 to rise. Pressing of the cruise button 17 energizes a solenoid 50 of a relay 51 resulting in circuit preparation for—wing flaps down; landing gear down; and seat belt sign on. The non-selective indicating lamps remain in circuit as previously described.

When preparing to land, the landing button 18 is depressed wherefor the cruise button rises and its relay is open circuited, and a relay 53 is energized by the landing button switch 34, by means of the solenoid 54. The landing relay prepares circuits for—wing de-icer on; landing gear up; seat belt sign off; wing flaps up; left propeller pitch high; and right propeller pitch high. Again, in the landing phase, the non-selective indicating lamps remain in circuit.

Having effected a landing and preliminary to leaving the airplane, the pilot operates the off button 20 which breaks the power supply circuit to the whole indicating system through the switch 56.

The tabulations below indicate the indicating circuit closures for all of the several phases of operation as preselected by the buttons 14, 17, 18 and 20 and as applied to Fig. 5.

|  | Take-off | Cruise | Land | Stop |
|---|---|---|---|---|
| *Left engine* |  |  |  |  |
| Oil press.: |  |  |  |  |
| Low | C | C | C | C |
| High | C | C | C | C |
| Oil temp.: |  |  |  |  |
| Low | C | C | C | C |
| High | C. | C | C | C |
| Prop. pitch: |  |  |  |  |
| Low |  |  |  |  |
| High | C |  | C |  |
| Fuel tanks: |  |  |  |  |
| L—Off | C | C | C | C |
| R—Off | C | C | C | C |
| L. fuel tank: |  |  |  |  |
| 1 | C | C | C | C |
| 2 | C | C | C | C |
| R. fuel tank: |  |  |  |  |
| 1 | C | C | C | C |
| 2 | C | C | C | C |
| Wing flaps: |  |  |  |  |
| Up | C |  | C |  |
| Down |  | C |  |  |
| Wing de-icer: |  |  |  |  |
| Off | C | C | C | C |
| On | C | C | C | C |
| Land. gear: |  |  |  |  |
| Up | C |  | C |  |
| Down |  | C |  |  |
| Seat belt sign: |  |  |  |  |
| Off | C |  | C |  |
| On |  | C |  | C |
| Right eng. oil press.: |  |  |  |  |
| Low | C | C | C | C |
| High | C | C | C | C |
| Oil temp.: |  |  |  |  |
| Low | C | C | C | C |
| High | C | C | C | C |
| Prop. pitch: |  |  |  |  |
| Low |  |  |  |  |
| High | C |  | C |  |

It will be seen that the items of this tabulation are identical with certain of the items in the comprehensive tabulation above. In connection with the more comprehensive system, there will be a greater variety of selection as between the several operating phases and for simplifying circuits and reducing the number of contacts in the relays, certain of the lights may be collected into partial groups each for operation by a single relay energized by the depression of more than one preselecting button. However, such an electric circuit organization and consolidation would be an obvious expedient to one skilled in the art so that a complete showing thereof is not deemed necessary in this disclosure.

The above description in connection with Fig. 5 will give a functional appreciation of the operation of the simplified system. However, Fig. 5 which is a schematic layout of the physical elements of the system, is rather difficult to follow as to the actual electrical wiring. Fig. 8 shows the wiring of the system in a straightforward manner and from the latter figure the specific circuits and interconnections may readily be traced. For the sake of simplicity, the relay solenoids for the relay switches 38, 46, 51, and 53 have been eliminated and merely the jack switches are shown. The indicating lamps are shown in a column on the left side of the figure, while the control switches operated by instruments, gages, and control members, are shown in a column on the righthand side of the figure. Obviously, each jack of the test switch unit 38 is connected to one of the indicating lamps, so that joint closure of these jacks will simultaneously light all lamps which are lightable. This enables the operator to quickly discern whether any lamps are burned out. Each lamp is connected straight across to its appropriate control switch in the righthand column, except that the straight-across wiring in some instances is interrupted by certain of the jacks in the switch units 46, 51 and 53, as is obvious in the diagram. It is these interruptions and combinations of interruptions in the lamp circuits, between the lamps and the control switches, which enables the indicating system to function in the manner above described in connection with Fig. 5.

Reference will now be made to some of the specific instrumentalities whose functioning is indicated on the panel. In connection with such instruments as oil pressure and oil temperature, limit contacts will be incorporated in respective instruments as indicated at 58 and 59, these limit contacts being connected through appropriate disconnect plugs 48 to the indicating lamps on the panel. When the instrument reads a maximum or minimum value, the appropriate limit contacts will close circuits, thus indicating in the central panel the deviation of the instrument from a normal value without the necessity of the pilot or crew continually scanning all of these instruments to determine whether or not they indicate within or without the proper range. All instruments of the large group shown in the panel of Fig. 3 will be similarly equipped with limit contacts, such instruments being, in addition to fuel pressure and oil pressure, oil temperature, head temperature, manifold pressure, carburetor heat, fuel analyzer, and others.

Figure 6:
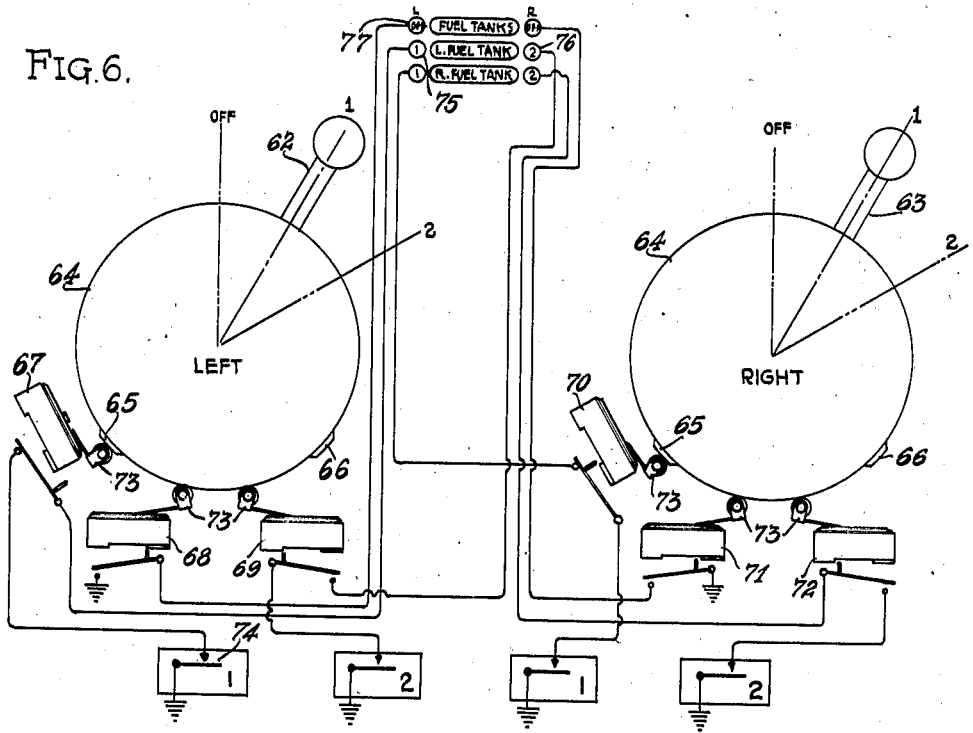
Fig. 6 is a diagram showing a fuel switch organization and the indicating device associated therewith.
Figure 7:
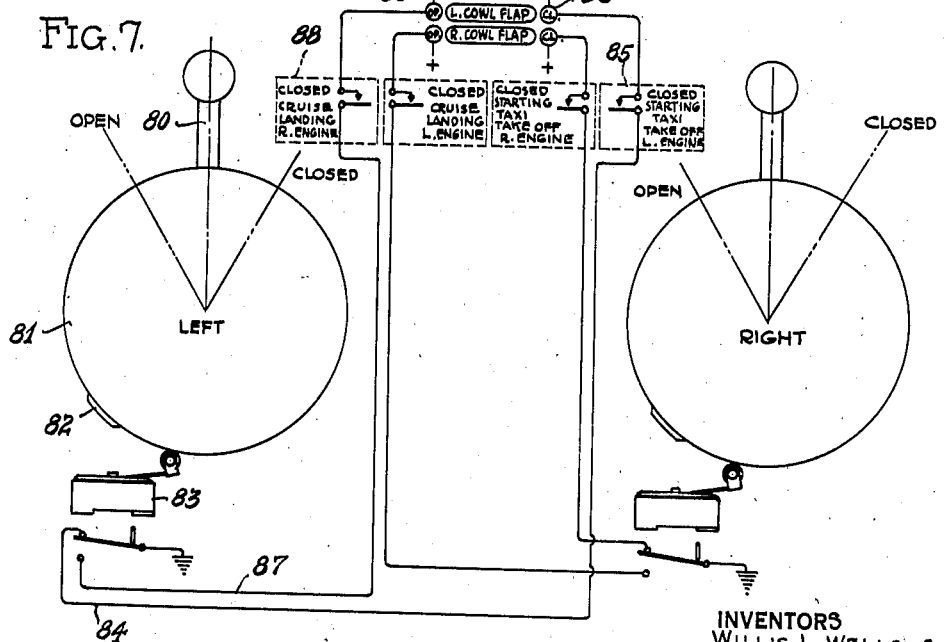
Fig. 7 is a diagram of a cowl flap control element along with the indicating provision therefor.

All control levers and the like, will be provided with switching means to close appropriate indicating circuits when the control levers are in certain positions. Figs. 6 and 7 show the general arrangement as applied to fuel tank controls and cowl flap controls respectively, these being typical of other controls which would have similar arrangements, such as propeller pitch, mixture control, cross-feed, wing flaps, landing gear, etc. Fig. 6 in detail shows handles 62 and 63 respectively operating valves in the fuel piping system. Each handle is provided with a disc 64 having cam projections 65 and 66 and adjacent to the periphery of the discs are switches 67 to 72 inclusive, each having a roller arm 73 adapted to be acted upon by the cams 65 or 66 to operate switches. The handle 62 is shown as being adjusted for left No. 1 tank whereupon the cam 65 closes switch 67. Switch 67 is in series with a switch 74 responsive in its closure to emptying of left No. 1 tank. Thus, if the fuel valve handle 62 be adjusted to open No. 1 tank, and said tank becomes empty, indicator 75 will light, apprising the pilot of the fact that the tank is empty. If the fuel valve be adjusted to position 2, cam 66 closes switch 69, setting up the circuit for No. 2 left fuel tank, so that, if said tank becomes empty indicator light 76 will be energized to indicate that the tank is empty. The same circuits and indications are arranged for the right fuel tank valve 63. If the handle 62 be moved to the off position, cam 65 closes switch 68, directly closing a circuit to light the indicator lamp 77 to apprise the pilot that the valve is off. In normal flight, both fuel valves should be open to either tank 1 or tank 2, respectively, and thus, the indicator light should not be lighted. The diagram of Fig. 6 is merely typical of an appropriate tankage arrangement for aircraft and the same principles may be followed regardless of the number of tanks used or the various interconnections between them.

Fig. 7 shows the control switch arrangement appropriate to operating mechanisms for mechanical devices, the showing being particularly applied to cowl flaps as used on two aircraft power plants. The handle 80 may be operated to open or close the left engine cowl flaps either by direct connection or by servo connection. This handle is provided with a disc 81 having a cam 82 which is engageable with the switch 83. This is a double throw switch so that when the cam follower thereof rides the disc 81, said switch closes the circuit embodying a wire 84 leading through the appropriate preselection relay 85 to the light 86. If the relay 85 is closed, and if the cowl flaps are closed, the light 86 will be energized to warn the pilot of this condition, when the reverse condition should exist. Then he may move the handle 80 so that the cam 82 engages the switch making a circuit through the wire 87 and another preselection relay 88 to the light 89 to indicate that the cowl is open. If the relay 85 is closed and the relay 88 is open, neither lights 86 or 89 will appear, but if the relay 85 be opened and the relay 88 closed, light 89 will appear. The simplified diagram of Fig. 7 is indicative of the individual circuits utilized in control devices whose proper position should be varied according to the flight phase and whose indication is consequently affected by any one of the buttons 12 to 20 inclusive as shown in Fig. 3.

Referring to Fig. 5, 90 indicates the seat belt sign which comprises an illuminated sign in the aircraft cabin warning passengers to fasten their seat belts, this sign normally being selectively illuminated during take-off and landing, and, during the cruising condition, only when rough air or danger is encountered. This sign is lighted by a manual switch 91, and to coordinate its operation with the indicating system, a relay 92 is energized by closure of the switch 91. This relay serves to operate a double throw switch 93 connected through the appropriate preselection relays to the proper seat belt sign lamps on the indicating panel. Other mechanisms operated merely by the throw of an electrical switch may be similarly arranged.

Again in Fig. 5, wing de-icing mechanisms are diagrammatically indicated at 94, the valve thereof being energized by a switch 95. In parallel with the valve circuit is a relay 96 operating on a double throw switch 97, one throw of which is connected to the wing de-icer indicator lamp through the "take-off" and "landing" relays. Thus, if the wing de-icer is deliberately turned on during the cruising phase, it will be indicated on the panel when transferring to another phase. The other throw of the switch 97 is connected through an icing indicator 98 directly to the wing de-icer "off" signal lamp. When the switch 95 is off, the switch 97 will normally make circuit through the open circuited icing indicator 98 to the "off" indicating lamp which will be dark. This would be the normal situation during any flight phase. Now, if the aircraft during flight encounters icing conditions, the indicator 98 which, incidentally is a device well-known in the art, will close the circuit thereby lighting the "off" indicating lamp. When this light appears on the panel the pilot will realize that icing conditions exist and will accordingly close the switch 95 to start operation of the de-icing mechanism, closure of the switch 95 simultaneously breaking the "off" indicating circuit.

In connection with landing gear control and indication, the controlling switches for the landing gear are diagrammatically indicated at 100, and the basic signal circuits operate in the manner heretofore disclosed. However, a safety device is incorporated in the landing gear control through the medium of switches 101 and 102, of the character shown in Figs. 6 and 7, on the left and right engine throttles 103 and 104. During cruising flight the throttles will be open and the switches 101 and 102 will likewise open. Should one or the other throttle be closed either inadvertently or intentionally, the airplane thereby is placed in the landing phase of operation. Accordingly, when either throttle is closed, either switch 101 or 102 is closed energizing a warning chime 105.

The drawings and description herein contained are particularly directed to a system for aircraft but it is apparent that the principles taught may readily be adapted to control and indicating systems in any field wherein preselection of various different groups of indicators may be desired for different operating conditions of the complex mechanism to which the indicating system may be applied. The scope of the invention is not to be considered as restricted to aircraft systems alone except as it may be so limited in the annexed claims.

The disclosure shows the system as utilizing a single light panel for observation by the pilot and his aide. Obviously, if it is desirable, parts or all of the panel may be duplicated in other parts of the aircraft, for observation by decentralized personnel, to whose care certain of the operations and controls may be entrusted. For instance, a flight engineer may have charge of controls of one or more engines, and engine instruments and their indicators should be duplicated for him. Operation of preselective relays by the pilot may also be indicated to the engineer by simple circuits and annunciators whereby he is informed as to the current or next intended flight phase and he may then more intelligently operate those instrumentalities within his control to the appropriate positions and adjustments. A further application of the system shown would comprise the elimination of many instruments and controls for the pilot, decentralizing these to the flight engineer or other officer, while all would be provided with the unitary "tell-tale" panel so that at all times they may have a concise visual summary of all phases of functioning of the whole aircraft. The system may be further extended to embrace warning lights on instruments and controls connected in parallel to light with respective indicator panel lights, or, in simple installations where controls and instruments are not numerous, such warning lights may be substituted for the indicating panel.

What we claim is:

1. The combination with a vehicle having thereon or made a part thereof a plurality of instrumentalities, said vehicle being operable under conditions necessitating in different phases of its operation the use of different combinations of the same or different instrumentalities according to the phase of operation being or about to be executed, of a group of indicators for indicating the operation characteristics of those instrumentalities appropriate to one said phase of operation, a second group of indicators for indicating the operation characteristics of those instrumentalities appropriate to a different phase of operation, the indicators in each instance being controlled in their response directly by the instrumentalities, and means for pre-selecting for positive indication, during or in advance of the phase of operation being or about to be executed, and without interrupting the operation of the vehicle, only those indicators comprised in a single group.

2. The combination with an airplane adapted to pass without a break in its continuity of flight from one phase of operation to another, said airplane having installed therein or made a part thereof a plurality of instrumentalities, one group of which said instrumentalities is appropriate to one said phase of flight operation and another group of which is appropriate to another said phase, of an indicator for each relevant operating position of each instrumentality, the several indicators being proximate to one another, means whereby said indicators in each instance are controlled in their response directly by the instrumentalities with which they are associated, and means appropriate to and operable prior to or during each flight phase to set up for indication only those indicators associated with the instrumentalities relevant to the flight phase being or about to be executed.

3. In combination in aircraft which in accomplishing a flight must necessarily pass through a sequence of operating phases viz. take-off, free flight and landing, a plurality of instrumentalities having adjustments for one or another phase of operation, an indicator and circuit for each relevant adjustment of each instrumentality, means whereby the indicators in each instance are controlled in their response directly by the instrumentalities with which they are associated, certain position adjustments of one or more of the instrumentalities being relevant to certain flight phases and other position adjustments being irrelevant to certain flight phases, and a plurality of unitary gang devices each comprising series switches in one or more of the indicator circuits and arranged when the different gang devices are closed to close the associated series switches to set up for operation those indicators needed for instrumentality indication in the operation phase corresponding to the gang device closed.

4. The combination with an airplane having installed therein or made a part thereof a plurality of instrumentalities, certain of which instrumentalities are required to be adjusted or to function in a given manner during that phase of operation designated take-off and certain of which are required to be adjusted or to function in a given manner during that phase of operation designated free flight; of a group of indicators for indicating whether or not those instrumentalities required to be adjusted or to function in a given manner in the execution of one said phase of operation are properly adjusted or functioning, a second group of indicators for indicating whether or not those instrumentalities required to be adjusted or to function in a given manner in the execution of the other said phase of operation are properly adjusted or functioning, means whereby the indicators in each instance are controlled in their response directly by the instrumentalities with which they are associated, and means manually operable from within the airplane and at the will of the operator to set up for positive indication all of the total number of indicators or only those indicators comprised in any given group.

5. The combination with an airplane having installed therein or made a part thereof a plurality of instrumentalities, certain of which instrumentalities are appropriate to one phase of airplane operation, and certain of which are appropriate to another, of a group of indicators for indicating the operation characteristics of those instrumentalities appropriate to one said phase of operation, a second group of indicators for indicating the operation characteristics of those instrumentalities appropriate to the other said phase of operation, means whereby the indicators in each instance are controlled in their response directly by the instrumentalities with which they are associated, and means for pre-selecting for positive indication only those indicators comprised in a single group.

6. The combination with an airplane having installed thereon or made a part thereof a plurality of instrumentalities, said airplane being operable under conditions necessitating in different phases of its operation the use of different instrumentalities according to the particular phase of operation being or about to be executed; of a group of indicators for indicating the operation characteristics of those instrumentalities appropriate to one said phase of operation, a second group of indicators for indicating the operation characteristics of those instrumentalities appropriate to a different phase of operation, means whereby the indicators in each instance are controlled in their response directly by the instrumentalities with which they are associated, and means for pre-selecting for positive indication during or in advance of the phase of operation being or about to be executed and without interrupting the operation of the airplane, only those indicators comprised in a single group.

7. In combination in aircraft wherein there exists a mandatory sequence of operation comprising phases such as take-off, normal flight and landing and wherein there are a plurality of instrumentalities requiring adjustment and indication during operation and which instrumentalities have functions during more than one phase but are adjustable differently for each phase, indicators for each instrumentality and for an adjustment thereof appropriate to each phase, means whereby the indicators in each instance are controlled in their response directly by the instrumentalities with which they are associated, and pre-selecting means, one for each flight phase, operable to set up for operation only those of said indicators appropriate to the instant or intended flight phase to enable the operator to determine which of the several instrumentalities appropriate to the instant or intended flight phase are improperly or properly adjusted.

8. In combination in aircraft wherein there exists a mandatory sequence of operation comprising phases such as take-off, normal flight and landing and wherein there are a plurality of instrumentalities requiring adjustment and indication during operation and which instrumentalities have functions during more than one phase but are adjustable differently for each phase, indicators for each instrumentality and for an adjustment thereof appropriate to each phase, means whereby the indicators in each instance are controlled in their response directly by the instrumentalities with which they are associated, and pre-selecting means, one for each flight phase, operable to set up for operation only those of said indicators appropriate to the instant or intended flight phase to enable the operator to determine which of the several instrumentalities appropriate to the instant or intended flight phase are improperly or properly adjusted, said indicators comprising juxtaposed illuminable panels the illumination of which is responsive to the state of adjustment of the instrumentalities for the pre-selected flight phase.

9. In a traveling vehicle adapted for translational movement at different levels relative to the earth's surface and for controlled transition from one level to another, the combination, of a plurality of instrumentalities some of which have function at one level, some at another level, some during rising transition and some during descending transition, indicators for the several instrumentalities, means whereby the indicators in each instance are controlled in their response directly by the instrumentalities with which they are associated, and a plurality of pre-selecting means, each said means being adapted by its individual operation to admit of a pre-selection of that group of indicators for actuation respectively appropriate to operation at different levels, during rising, and during descent of the vehicle.

10. In aircraft adapted for forward movement along the earth's surface and parallel thereto at different levels and movable for controlled transition between ground level to a higher level and from one level to another, the combination, of a plurality of instrumentalities some of which have function at one level, some at another level, some during rising transition and some during descending transition, indicators for the several instrumentalities, means whereby the indicators in each instance are controlled in their response directly by the instrumentalities with which they are associated, and a plurality of pre-selecting means each adapted to pre-select that group of indicators for actuation respectively appropriate to operation at different levels, during rising, and during descent of the vehicle.

11. In combination in aircraft wherein a complete flight thereof includes the sequential operating phases of starting, take-off, cruising, landing, and stopping, a plurality of instrumentalities essential to the successful operation of the aircraft during a complete flight, a lightable indicator panel for each instrumentality and connected therewith for lighting in response to faulty adjustment of the instrumentality in any certain operating phase, circuits for respective panel lights and instrumentalities, and a plurality of selector switches each appropriate to one of said flight operating phases and connected into divergent pluralities of said circuits for preparing the indicators for lighting should the instrumentalities be inappropriately adjusted for the particular operating phase selected by closure of one of said selector switches.

WILLIS L. WELLS.
RAYMOND A. RUGGE.